(12) United States Patent
Xi et al.

(10) Patent No.: US 11,809,485 B2
(45) Date of Patent: Nov. 7, 2023

(54) METHOD FOR RETRIEVING FOOTPRINT IMAGES

(71) Applicants: SUZHOU UNIVERSITY OF SCIENCE AND TECHNOLOGY, Jiangsu (CN); KUNSHAN PUBLIC SECURITY BUREAU, Jiangsu (CN)

(72) Inventors: Xuefeng Xi, Jiangsu (CN); Yang Chen, Jiangsu (CN); Cheng Zeng, Jiangsu (CN); Qian Zhang, Jiangsu (CN); Cheng Cheng, Jiangsu (CN); Baochuan Fu, Jiangsu (CN); Zhiming Cui, Jiangsu (CN)

(73) Assignees: SUZHOU UNIVERSITY OF SCIENCE AND TECHNOLOGY, Jiangsu (CN); KUNSHAN PUBLIC SECURITY BUREAU, Jiangsu (CN)

( * ) Notice: Subject to any disclaimer, the term of this patent is extended or adjusted under 35 U.S.C. 154(b) by 274 days.

(21) Appl. No.: 17/421,021

(22) PCT Filed: Nov. 25, 2020

(86) PCT No.: PCT/CN2020/131406
§ 371 (c)(1),
(2) Date: Jul. 7, 2021

(87) PCT Pub. No.: WO2021/115123
PCT Pub. Date: Jun. 17, 2021

(65) Prior Publication Data
US 2022/0100793 A1    Mar. 31, 2022

(30) Foreign Application Priority Data
Dec. 12, 2019    (CN) .......................... 201911272472.1

(51) Int. Cl.
*G06F 16/58* (2019.01)
*G06V 10/774* (2022.01)
(Continued)

(52) U.S. Cl.
CPC ............... *G06F 16/58* (2019.01); *G06N 3/04* (2013.01); *G06V 10/32* (2022.01); *G06V 10/40* (2022.01);
(Continued)

(58) Field of Classification Search
CPC ......... G06N 3/04; G06F 16/58; G06F 16/583; G06V 10/32; G06V 10/40; G06V 10/761;
(Continued)

(56) References Cited

U.S. PATENT DOCUMENTS

2005/0232512 A1\* 10/2005 Luk ...................... G06F 18/256
382/190
2019/0130603 A1    5/2019 Sun et al.

FOREIGN PATENT DOCUMENTS

| AU | 2019100354 | 5/2019 |
| CN | 109583452 | 4/2019 |

(Continued)

OTHER PUBLICATIONS

Yang et al., "A CNN-based Approach to Footprint Image Retrieval and Matching." (Year: 2018).*
(Continued)

*Primary Examiner* — Ross Varndell
(74) *Attorney, Agent, or Firm* — JCIP GLOBAL INC.

(57) ABSTRACT

A method for retrieving footprint images is provided, comprising: pre-training models; cleaning footprint data and conducting expansion pre-processing by using the pre-trained models, dividing the footprint data into multiple data sets; adjusting full connection layers and classification layers of the models; training the models again by using the
(Continued)

data sets through the parameters of the pre-trained models; saving the models trained twice, removing the classification layer, executing a feature extraction for images in an image library and a retrieval library to form a feature index library; connecting the features extracted by three models to form fused features, establishing a fused feature vector index library; extracting the features of the images in the image library to be retrieved in advance, and establishing a feature vector library; calculating distances in the retrieval library and the image library when a single footprint image is inputted, thereby outputting the image with the highest similarity.

9 Claims, 2 Drawing Sheets

(51) Int. Cl.
- *G06V 10/80* (2022.01)
- *G06V 40/10* (2022.01)
- *G06V 10/74* (2022.01)
- *G06V 10/32* (2022.01)
- *G06V 10/40* (2022.01)
- *G06V 10/82* (2022.01)
- *G06V 40/50* (2022.01)
- *G06N 3/04* (2023.01)

(52) U.S. Cl.
CPC ........ *G06V 10/761* (2022.01); *G06V 10/7747* (2022.01); *G06V 10/806* (2022.01); *G06V 10/82* (2022.01); *G06V 40/155* (2022.01); *G06V 40/50* (2022.01)

(58) Field of Classification Search
CPC .. G06V 10/7747; G06V 10/806; G06V 10/82; G06V 40/155; G06V 40/50
See application file for complete search history.

(56) References Cited

FOREIGN PATENT DOCUMENTS

| CN | 110008841 | 7/2019 |
|---|---|---|
| CN | 110263863 | 9/2019 |
| CN | 110443155 | 11/2019 |
| CN | 111177446 | 5/2020 |

OTHER PUBLICATIONS

Zhang et al., "Adapting Convolutional Neural Networks on the Shoeprint Retrieval for Forensic Use." (Year: 2017).*

Chen Yang et al., "A CNN-based Approach to Footprint Image Retrieval and Matching", Journal of Nanjing Normal University( Engineering and Technology Edition), Sep. 2018, submit with English abstract, pp. 39-45.

"International Search Report (Form PCT/ISA/210) of PCT/CN2020/131406," dated Jan. 26, 2021, with English translation thereof, pp. 1-6.

* cited by examiner

METHOD FOR RETRIEVING FOOTPRINT IMAGES

CROSS-REFERENCE TO RELATED APPLICATION

This application is a 371 of international application of PCT application serial no. PCT/CN2020/131406, filed on Nov. 25, 2020, which claims the priority benefit of China application no. 201911272472.1, filed on Dec. 12, 2019. The entirety of each of the above mentioned patent applications is hereby incorporated by reference herein and made a part of this specification.

BACKGROUND

Technical Field

The present invention relates to a method for retrieving footprint images.

Description of Related Art

At present, the research of image retrieval began in the 1970s. At first, text-based image retrieval was used, which described the features of images through words. Content-based image retrieval began to appear in the early 20th century, which analyzed the color and the texture of the images and improve the accuracy of search through shallow classifier technologies such as support vector machines. However, these methods still cannot solve the problem of semantic gap. With the research and development of deep learning, the convolutional neural network (CNN) has performed well in image retrieval and identification in recent years. As various types of image identification competitions (such as ImageNet and Kaggle) are held, various variant models of the CNN, such as AlexNet [12], VGG, GoogLeNet, ResNet and DenseNet, have dominated the field of computer vision by virtue of the excellent identification accuracy, so that the application of the CNN in image retrieval and content identification has high reliability.

At present, face recognition technology and automatic fingerprint and palmprint recognition and retrieval technologies have been maturely applied in the criminal case detection of the police. As another main trace of crime scene, the footprint image also has a nonnegligible role. The traditional methods of footprint retrieval and identification often need to consume a large number of human resources and time, and manual retrieval under large data amount is easy to make mistakes. Therefore, there is a strong application demand for automatic footprint retrieval systems. However, in the research of automatic footprint matching systems, the traditional shallow machine learning methods are mainly used to process the footprint images, which will take more time and need to increase the accuracy.

SUMMARY

The purpose of the present invention is to overcome defects in the prior art, so as to provide a method for retrieving footprint images.

The purpose of the present invention is realized by the following technical solution.

A method for retrieving footprint images comprises:
firstly, pre-training models through ImageNet data; cleaning footprint data and conducting expansion pre-processing for the footprint data by using the models which are pre-trained, and dividing the footprint data into a plurality of data sets of different uses; adjusting full connection layers and classification layers of the models; training the models again by using the data sets through the parameters of the models pre-trained; then, saving the models trained twice, removing the classification layer, and executing a feature extraction for images in an image library and a retrieval library to form a feature index library;
extracting the features by three models, connecting the features extracted by the three models to form fused features, and establishing a fused feature vector index library; extracting the features of the images in the image library to be retrieved in advance, and establishing a feature vector library; and calculating distances in the retrieval library and the image library when a single footprint image is inputted, thereby outputting the image with the highest similarity.

Further, the above method for retrieving the footprint images comprises the following steps.

a) Firstly, the footprint data is cleaned and pre-processed; dividing the data sets of the footprint images into five parts of gallery, query, train, train all and val; randomly selecting the images from each category in the gallery to form the query; each category in the gallery comprising more than 6 images similar to an image to be retrieved; selecting one footprint image from each category of the train all to form a val data set;
normalizing the data, and for the data sets, executing a normalization processing by a per-example mean subtraction method.

b) Then, model structures are adjusted and the models are trained;
modifying the full connection layers of the three different models and the subsequent parts of the full connection layers, and defining new full connection layers and new classification layers in the order of linear layers, batch standardization, linear rectification functions and linear layers; modifying the original full connection layers to 512 dimensions and adding a new classification layer in Resnet50 and densenet121; reserving the first full connection layer in the VGG19 model, removing the second full connection layer, adding a new classification layer, and determining the number of the new classification layers according to the image category in a training set; initializing the parameters of the layers which are newly added by Kaiming initialization, wherein other parameters are parameters pre-trained by the model on ImageNet; conducting training by the three adopted models on the data sets of the footprint images.

c) Next, the features by a trained deep neural network and an integrated deep neural network are extracted, and the feature index library is established;
after training the models on the data sets of the footprint images, reserving all layers in a network structure except the classification layers, and extracting the features of each image in a footprint image library through a network model; establishing the feature vector index library of the footprint images after extracting the features of all images.

d) Finally, the similarity of the footprint images through a distance measurement method is calculated and a retrieval result is outputted;
extracting the features of the images by a convolutional neural network, establishing feature vectors, representing the corresponding images based on the feature vectors of the images, and determining the similarity between the images by calculating the distance between the feature vectors of the images; calculating the feature vectors of similar images by using Euclidean distance and cosine distance, wherein a Euclidean distance equation is used to measure an absolute distance between points in a multi-dimensional space, as shown below:

$$d(x, y) = \sqrt{\sum_{i=1}^{m}(x_i - y_i)^2},$$

measuring the difference between two individuals by the cosine distance through the cosine value of an angle between two vectors in a vector space, wherein the two vectors have different directions, with the formula shown below:

$$sim(x, y) = \cos\theta = \frac{\vec{x} \cdot \vec{y}}{\|x\| \cdot \|y\|},$$

the image library comprises N images, and the similarity is calculated by the following formula:

$$D_i = \|q - T_i\|, i \in [1, N],$$

wherein q represents the feature vector of the image to be retrieved, T represents the ith footprint image in the footprint image library, and D represents the distance between different vectors; the Euclidean distance and the cosine distance are used; the smaller the D value is, the higher the similarity between two images is; and then, D values are compared through a sorting algorithm to find and output the most similar N images.

Further, in the above method for retrieving the footprint images, in step a), the data sets of the footprint images are provided by the police agency; and high-quality footprint images are selected from the footprint images of a crime scene for retrieval, and subjected to data enhancement operation, rotation, random cropping and gray value and contrast conversion.

Further, in the above method for retrieving the footprint images, in step a), the data sets of the footprint images comprise 91 categories and more than 5000 images.

Further, in the above method for retrieving the footprint images, in step a), the input footprint image of about 1000×2000 pixels is adjusted to 128×256 to facilitate feature extraction.

Further, in the above method for retrieving the footprint images, in step a), the normalization processing comprises converting the images, which are inputted, into a matrix and then subtracting the statistical mean value of data from each sample, i.e., calculating the mean value of each sample respectively, then subtracting the corresponding mean value of each sample, and taking an average pixel as the center; for the data of the images, the normalization method is used to remove the average brightness value of the images and reduce the interference of background effects of the images; and the images are converted to tensors and normalized to 0-1.

Further, in the above method for retrieving the footprint images, in step b), because the length of the footprint image is larger than the width, adaptive mean pooling is used to designate a pooling kernel, and the adaptive mean pooling is easy to extract the features of the image.

Further, in the above method for retrieving the footprint images, in step b), in a training process, 40 rounds of iteration are set, and a stochastic gradient descent (SGD) mode is used to conduct back propagation on the basis of pre-training parameters on ImageNet; by using the adaptive mean pooling, the length of the footprint image is larger than the width and the pooling kernel is specified; the adaptive mean pooling is easy to be realized; in the training process, the SGD mode is used to conduct back propagation on the basis of the pre-training parameters on ImageNet, with the formula shown below:

$$\theta = \theta - \eta \cdot \nabla_\theta J(\theta; x^i, y^i),$$

wherein J is an objective function to be optimized by SGD; $x^i$ and $y^i$ represent a training sample and a label of the training sample respectively; θ represents parameters, weight and bias of the models;

a dynamic learning rate is used, and the formula is defined as follows:

$$lr = lr_0 \times \lambda^{\frac{epoch}{step\_size}},$$

wherein lr represents a current learning rate; $lr_0$ represents an initial learning rate; λ represents the decay factor of the learning rate; step_size is the number of changing steps of the learning rate; and epoch represents the number of rounds of the current iteration.

Further, in the above method for retrieving the footprint images, in step c), when Resnet50 and Densenet121 are used to extract the features, the dimension of the feature vector is 512, and the dimension of the feature vector extracted by VGG19 model is 4096; meanwhile, different key information is fused to reserve more comprehensive features for final retrieval; and the feature vectors extracted by different models are connected to obtain the final feature vectors with the dimension of 5120.

Compared with the prior art, the present invention has apparent advantages and beneficial effects specifically reflected as follows.

① The method for retrieving the footprint images in the present invention is an integrated deep neural network method for extracting the features of the footprint images. The features extracted from three different models are connected to obtain more abundant footprint image description. The cosine distance can be matched to obtain a good and stable retrieval effect. Furthermore, the models are pre-trained through transfer learning so as to achieve good performance on the footprint data sets with small data amount.

② The identification and retrieval functions of the footprint images are realized through data cleaning and pre-processing, transfer learning, structural fine adjustment and secondary training of the models, feature extraction and fused feature representation of the footprint images, and similarity calculation, to satisfy the actual demands of police combat.

③ A deep learning model is combined for retrieving and matching the footprint images. The method based on transfer learning solves the problem of lack of data amount. The method of feature fusion is used for feature representation of the footprint images to form more abundant image feature expressions. The method of extracting the fused features enriches the feature description mode of the footprint images and further increases the accuracy of the final retrieval result. A large number of images can be matched and reduced to only retrieve from a limited number of candidate images, so as to provide feasibility for further manual judgment, reduce the time needed for manual retrieval and inspection to a certain extent and achieve functions in police investigation.

④ The method of the present invention scientifically and effectively helps the police to detect a criminal case, greatly reduces the time and effort consumed in the manual retrieval process, significantly reduces the cost of manpower and material resources and has good practical application value.

DESCRIPTION OF THE EMBODIMENTS

The technical solutions in the embodiments of the present invention will be clearly and fully described below in combination with the drawings in the embodiments of the present invention. Apparently, the described embodiments are merely part of the embodiments of the present invention, not all of the embodiments.

Figure 1:
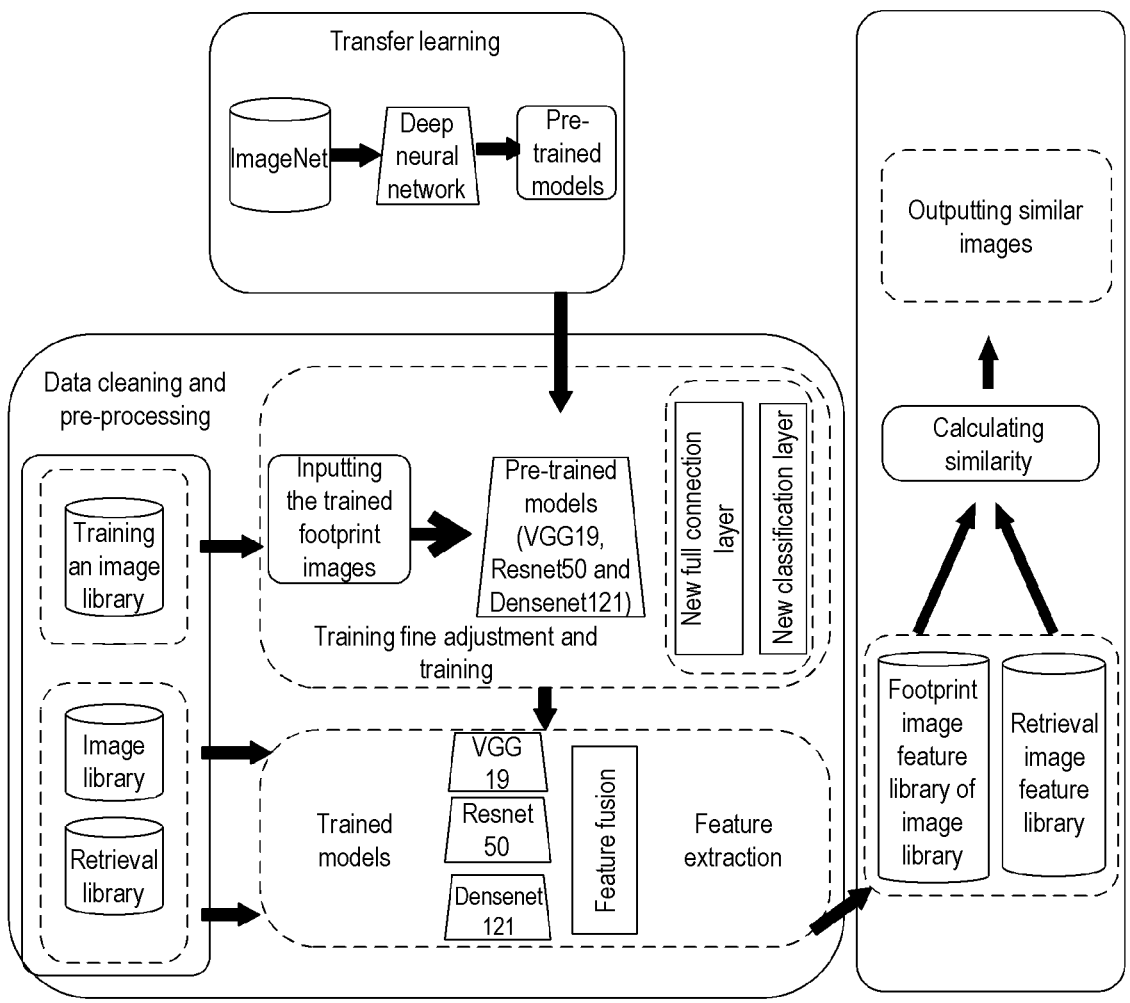
FIG. 1 is a schematic diagram of a process relation of the present invention.

As shown in FIG. 1, a method for retrieving footprint images comprises: firstly, pre-training models through ImageNet data; cleaning footprint data and conducting expansion pre-processing for the footprint data by using the models which are pre-trained, and dividing the footprint data into a plurality of data sets of different uses; adjusting full connection layers and classification layers of the models; training the models again by using the data sets through the parameters of the models which are pre-trained; then, saving the models trained twice, removing the classification layer of the models trained twice, and executing a feature extraction for images in an image library and a retrieval library to form a feature index library;

extracting the features by three models, connecting the features extracted by the three models to form fused features, and establishing a fused feature vector index library; extracting the features of the images in the image library to be retrieved in advance, and establishing a feature vector library; and calculating distances in the retrieval library and the image library when a single footprint image in the retrieval library is inputted, thereby outputting the image with the highest similarity.

Of course, the images that are not in the library to be retrieved can also be used. The features are also extracted through the above steps, and then the distance on the vector is calculated with the features in the image feature library; and 10 results with the nearest distance from the feature vectors of the input footprint images are output.

The method comprises the following specific steps.

a) Firstly, the footprint data is cleaned and pre-processed.

The data sets of the footprint images are provided by the police agency; and high-quality footprint images are selected from the footprint images of a crime scene for retrieval, and subjected to data enhancement operation, rotation, random cropping and gray value and contrast conversion. The data sets of the footprint images comprise 91 categories and more than 5000 images. The data sets of the footprint images are divided into five parts of gallery, query, train, train all and val; the images are randomly selected from each category in the gallery to form the query; each category in the gallery comprises more than 6 images similar to an image to be retrieved; one footprint image is selected from each category of the train all to form a val data set; and basic data set information is shown in Table 1.

TABLE 1

| Data Sets of Footprint Images | | | | | |
|---|---|---|---|---|---|
| | gallery | query | train | train all | val |
| Number of Categories | 51 | 51 | 40 | 40 | 40 |
| Average Number of Images in Each Category | 48 | 8 | 64 | 65 | 1 |
| Total Number of Images | 2490 | 432 | 2568 | 2608 | 40 |

The input footprint image of about 1000×2000 pixels is adjusted to 128×256 to facilitate the extraction of feature parameters. Meanwhile, the data is normalized, and a normalization processing is executed for the data sets by a per-example mean subtraction method. Namely, the images, which are inputted, are converted into a matrix and then the statistical mean value of data is subtracted from each sample, i.e., the mean value of each sample is calculated respectively, then the corresponding mean value of each sample is subtracted, and an average pixel is taken as the center; for the image data, the normalization method removes the average brightness value of the images and reduces the interference of image background effects; and the images are converted to tensors and normalized to 0-1.

b) Then, the structures of the models are adjusted and the models are trained.

The full connection layers of the three different models and the subsequent parts of the full connection layers, and defining new full connection layers and classification layers are modified in the order of linear layers, batch standardization, linear rectification functions and linear layers; the original full connection layers are modified to 512 dimensions and a new classification layer is added in Resnet50 and densenet121; in the VGG19 model, the first full connection layer is reserved, the second full connection layer is removed and a new classification layer is added, and the number of the new classification layers is determined according to the image category in a training set; the parameters of the layers, which are newly added, are initialized by Kaiming initialization, wherein other parameters are from the models which are pre-trained on ImageNet; training by the three adopted models on the data sets of the footprint images is conducted.

By using the adaptive mean pooling, the length of the footprint image is larger than the width and the pooling kernel is specified; the adaptive mean pooling is easy to be realized; in the training process, 40 rounds of iteration are set, and the SGD mode is used to conduct back propagation on the basis of the pre-training parameters on ImageNet, with the formula shown below:

$$\theta = \theta - \eta \cdot \nabla_\theta J(\theta; x^i, y^i),$$

wherein J is an objective function to be optimized by SGD; $x^i$ and $y^i$ represent a training sample and a label of the training sample respectively; θ represents parameters, weight and bias of the models;

a dynamic learning rate is used, and the formula is defined as follows:

$$lr = lr_0 \times \lambda^{\frac{epoch}{step\_size}},$$

wherein lr represents a current learning rate; $lr_0$ represents an initial learning rate; $\lambda$ represents the decay factor of the learning rate; step_size is the number of changing steps of the learning rate; and epoch represents the number of rounds of the current iteration.

Setting parameters: setting batch size as 32 and basic learning rate as 0.1, and updating the learning rate every 40 iterations; the final model training accuracy reaches 98%.

c) Next, the features are extracted by a trained deep neural network and an integrated deep neural network, and a feature index library is established.

The extraction of the feature vectors is particularly important in image retrieval based on deep learning. Through the comparative analysis of current various mainstream convolutional neural networks, three typical models (Resnet50, Densenet121 and VGG19) are adopted. After training the models on the data sets of the footprint images, all the layers in a network structure except the classification layers are reserved, and the features of each image in a footprint image library are extracted through a network model; when Resnet50 and Densenet121 are used to extract the features, the dimension of the feature vector is 512, and the dimension of the feature vector extracted by VGG19 model is 4096.

A new method for feature fusion is used for feature representation of the footprint images. Considering that the footprint images extracted by different models have different feature descriptions which contain the information of some key positions, to fuse different key information to reserve more comprehensive features for final retrieval, the feature vectors extracted by different models are connected to obtain the final feature vectors with the dimension of 5120.

The feature vector index library of the footprint images is established after extracting the features of all the images.

d) Finally, the similarity of the footprint images is calculated through a distance measurement method and a retrieval result is outputted.

The features of the image are extracted by a convolutional neural network, feature vectors are established, the corresponding images are represented based on the feature vectors of the images, and the similarity between the images is determined by calculating the distance between the feature vectors of the images; the feature vectors of similar images are calculated by using Euclidean distance and cosine distance, wherein a Euclidean distance equation is used to measure an absolute distance between points in a multi-dimensional space, as shown below:

$$d(x, y) = \sqrt{\sum_{i=1}^{m}(x_i - y_i)^2},$$

the difference between two individuals is measured by the cosine distance through the cosine value of an angle between two vectors in a vector space, wherein the two vectors in the sets have different directions, with the formula shown below:

$$sim(x, y) = \cos\theta = \frac{\vec{x} \cdot \vec{y}}{\|x\| \cdot \|y\|}.$$

The image library comprises N images, and the similarity is calculated by the following formula:

$$D_i = \|q - T_i\|, i \in [1, N],$$

wherein q represents the feature vector of the image to be retrieved, T represents the ith footprint image in the footprint image library, and D represents the distance between different vectors; the Euclidean distance and the cosine distance are used; the smaller the D value is, the higher the similarity between two images is; and then, D values are compared through a sorting algorithm to find and output the most similar N images.

The performance of three deep network models and the method for feature fusion and integration is evaluated by combining five mainstream evaluation indexes. The five evaluation indexes are recall rate, accuracy, F1 score, rank-n and mean accuracy, wherein when the Euclidean distance is used as a measurement function, the results are much higher than the VGG model in all the evaluation indexes, and have little difference from two separate models Resnet50 and Densenet121, but slightly lower than the two models. When the cosine distance is used, the method of feature fusion obtains highest scores in all the indexes except mAP, has specific scores of 83.63%, 82.99%, 83.31%, 100%, 100% and 85.60% in recall rate, accuracy, F1 score, Rank1, Rank10 and mean accuracy, and has stable performance in various indexes. This indicates that the method of feature fusion has good actual effects.

Figure 2:
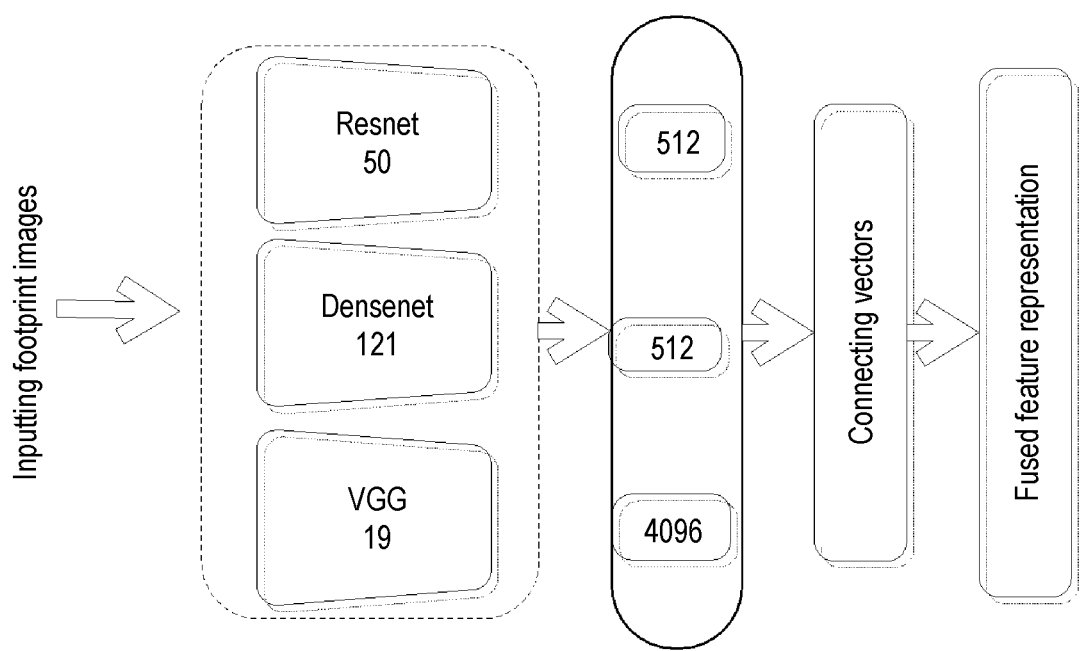
FIG. 2 is a schematic diagram of a feature fusion part of the present invention.

As shown in FIG. 2, the feature vectors extracted by three models are connected to form fused feature vectors for representing the footprint images, and the dimension is the sum of the extraction feature dimensions of the three model, namely 5120.

The method for retrieving the footprint images in the present invention is an integrated deep neural network method for extracting the features of the footprint images. The features extracted from three different models are connected to obtain more abundant footprint image description. The cosine distance can be matched to obtain a good and stable retrieval effect. The models are pre-trained through transfer learning so as to achieve good performance on the footprint data sets with small data amount.

In conclusion, the identification and retrieval functions of the footprint images are realized in the present invention through data cleaning and pre-processing, transfer learning, structural fine adjustment and secondary training of the models, feature extraction and fused feature representation of the footprint images, and similarity calculation, to satisfy the actual demands of police combat.

A deep learning model is combined for retrieving and matching the footprint images. The method based on transfer learning solves the problem of lack of data amount. The method of feature fusion is used for feature representation of the footprint images to form more abundant image feature expressions. The method of extracting the fused features enriches the feature description mode of the footprint images and further increases the accuracy of the final retrieval result. A large number of images can be matched and reduced to only retrieve from a limited number of candidate images, so as to provide feasibility for further manual judgment, reduce the time needed for manual retrieval and inspection to a certain extent and achieve functions in police investigation.

The method of the present invention scientifically and effectively helps the police to detect a criminal case, greatly reduces the time and effort consumed in the manual retrieval process, significantly reduces the cost of manpower and material resources and has good practical application value.

The above only describes specific embodiments of the present invention, but the protection scope of the present invention is not limited thereto. Any change or replacement contemplated easily by those skilled in the art familiar with the technical field within the technical scope disclosed by the present invention shall be covered within the protection scope of the present invention. Therefore, the protection scope of the present invention shall be determined by the protection scope of the claims.

What is claimed is:

1. A method for retrieving footprint images, comprising:

firstly, pre-training models through ImageNet data; cleaning footprint data and conducting expansion pre-processing for the footprint data by using the models which are pre-trained, and dividing the data sets of footprint images into five parts of a gallery data set, a query data set, a train data set, a train all data set and a val data set, wherein the query data set is formed by randomly selecting the images from each category in the gallery data set, each category in the gallery data set comprising more than 6 images similar to an image to be retrieved; the val data set is formed by selecting one footprint image from each category of the train all data set and normalizing the footprint data, and for the data sets, executing a normalization processing by a per-example mean subtraction method;

adjusting full connection layers and classification layers of the models, comprising: modifying the full connection layers of three different models and subsequent parts of the full connection layers, and defining new full connection layers and new classification layers in an order of linear layers, batch standardization, linear rectification functions and linear layers, wherein the three different models are Resnet50 model, densenet121 model and VGG19 model; in the Resnet50 model and the densenet121 model, modifying original full connection layers to 512 dimensions and adding a new classification layer; in the VGG19 model, reserving a first full connection layer, removing a second full connection layer, adding a new classification layer, and determining the number of the new classification layers according to an image category in a training set initializing parameters of layers which are newly added by Kaiming initialization, wherein other parameters are from the models which are pre-trained on ImageNet; conducting training by the three adopted models on the data sets of the footprint images;

training the models again by using the data sets through parameters of the models which are pre-trained; then, saving the models trained twice, removing the classification layer of the models trained twice, and executing a feature extraction for images in an image library and a retrieval library to form a feature index library;

extracting features by three models, connecting the features extracted by the three models to form fused features, and establishing a fused feature vector index library; extracting the features of the images in the image library to be retrieved in advance, and establishing a feature vector library; and calculating distances in the retrieval library and the image library when a single footprint image is inputted, thereby outputting the image with the highest similarity.

2. The method for retrieving the footprint images according to claim 1, further comprising the following steps:

extracting the features by a trained deep neural network and an integrated deep neural network, and establishing the feature index library;

after training the models on the data sets of the footprint images, reserving all layers in a network structure except the classification layers, and extracting the features of each image in a footprint image library through a network model; establishing the feature vector index library of the footprint images after extracting the features of all images;

finally, calculating the similarity of the footprint images through a distance measurement method and outputting a retrieval result;

extracting the features of the images by a convolutional neural network, establishing feature vectors, representing the corresponding images based on the feature vectors of the images, and determining the similarity between the images by calculating the distance between the feature vectors of the images; calculating the feature vectors of similar images by using Euclidean distance and cosine distance, wherein a Euclidean distance equation is used to measure an absolute distance between points in a multi-dimensional space, as shown below:

$$d(x, y) = \sqrt{\sum_{i=1}^{m}(x_i - y_i)^2},$$

measuring difference between two individuals by the cosine distance through a cosine value of an angle between two vectors in a vector space, wherein the two vectors have different directions, with the formula shown below:

$$sim(x, y) = \cos\theta = \frac{\vec{x} \cdot \vec{y}}{\|x\| \cdot \|y\|},$$

the image library comprises N images, and the similarity is calculated by the following formula:

$$D_i = \|q - T_i\|, i \in [1, N],$$

wherein q represents the feature vector of the image to be retrieved, T represents the $i^{th}$ footprint image in the footprint image library, and D represents the distance between different vectors; the Euclidean distance and the cosine distance are used; the smaller the D value is, the higher the similarity between two images is; and then, D values are compared through a sorting algorithm to find and output the most similar N images.

3. The method for retrieving the footprint images according to claim 2, wherein in step of extracting the features, when the Resnet50 model and the Densenet121 model are used to extract the features, a dimension of the feature vector is 512, and the dimension of the feature vector extracted by the VGG19 model is 4096; meanwhile, different key information is fused to reserve more comprehensive features for final retrieval; and the feature vectors extracted by different models are connected to obtain the final feature vectors with the dimension of 5120.

4. The method for retrieving the footprint images according to claim 1, wherein the data sets of the footprint images are provided by a police agency; and high-quality footprint images are selected from the footprint images of a crime scene for retrieval, and subjected to data enhancement operation, rotation, random cropping and gray value and contrast conversion.

5. The method for retrieving the footprint images according to claim 1, wherein the data sets of the footprint images comprise 91 categories and more than 5000 images.

6. The method for retrieving the footprint images according to claim 1, wherein each footprint image of 1000×2000 pixels is adjusted to 128×256 to facilitate feature extraction.

7. The method for retrieving the footprint images according to claim 1, wherein the normalization processing comprises converting images, which are inputted, into a matrix and then subtracting a statistical mean value of data from each sample, that is, calculating the mean value of each sample respectively, then subtracting the corresponding mean value of each sample, and taking an average pixel as the center; for data of the images, a normalization method is used to remove an average brightness value of the images and reduce an interference of background effects of the images; and the images are converted to tensors and normalized to 0-1.

8. The method for retrieving the footprint images according to claim 1, wherein because a length of the footprint image is larger than a width, adaptive mean pooling is used to designate a pooling kernel, and the adaptive mean pooling is easy to extract the features of the image.

9. The method for retrieving the footprint images according to claim 1, wherein in a training process, 40 rounds of iteration are set, and a stochastic gradient descent (SGD) mode is used to conduct back propagation on the basis of pre-training parameters on ImageNet; by using adaptive mean pooling, a length of the footprint image is larger than a width and a pooling kernel is specified; the adaptive mean pooling is easy to be realized; in the training process, the SGD mode is used to conduct back propagation on the basis of the pre-training parameters on ImageNet, with the formula shown below:

$$\theta = \theta - \eta \cdot \nabla_\theta J(\theta; x^i, y^i),$$

wherein J is an objective function to be optimized by SGD; $x^i$ and $y^i$ represent a training sample and a label of the training sample respectively; $\theta$ represents parameters, weight and bias of the models;

a dynamic learning rate is used, and the formula is defined as follows:

$$lr = lr_0 \times \lambda^{\frac{epoch}{step\_size}},$$

wherein lr represents a current learning rate; $lr_0$ represents an initial learning rate; $\lambda$ represents a decay factor of the learning rate; step_size is the number of changing steps of the learning rate; and epoch represents the number of rounds of a current iteration.

\* \* \* \* \*